(12) United States Patent
DeCusatis et al.

(10) Patent No.: US 10,122,653 B2
(45) Date of Patent: Nov. 6, 2018

(54) ENERGY MANAGEMENT SYSTEM FOR A DATA CENTER NETWORK

(71) Applicant: International Business Machines Corporation, Armonk, NY (US)

(72) Inventors: Casimer M. DeCusatis, Poughkeepsie, NY (US); Thomas A. Gregg, Highland, NY (US); Rajaram B. Krishnamurthy, Wappingers Falls, NY (US); Anuradha Rao, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1326 days.

(21) Appl. No.: 13/708,989

(22) Filed: Dec. 8, 2012

(65) Prior Publication Data

US 2014/0164644 A1 Jun. 12, 2014

Related U.S. Application Data

(63) Continuation of application No. 13/096,042, filed on Apr. 28, 2011, now abandoned.

(51) Int. Cl.
| | |
|---|---|
| *H04L 12/931* | (2013.01) |
| *G06F 9/50* | (2006.01) |
| *G06F 1/32* | (2006.01) |
| *H04L 12/937* | (2013.01) |

(52) U.S. Cl.
CPC .......... *H04L 49/356* (2013.01); *G06F 1/3203* (2013.01); *G06F 9/5094* (2013.01); *H04L 49/253* (2013.01)

(58) Field of Classification Search
CPC ...................................................... H04L 49/356
USPC .................................................. 709/240, 217
See application file for complete search history.

(56) References Cited

U.S. PATENT DOCUMENTS

| | | | |
|---|---|---|---|
| 6,594,557 B1* | 7/2003 | Stefan et al. ..................... 701/1 |
| 6,842,443 B2 | 1/2005 | Allen, Jr. et al. |
| 7,257,616 B2* | 8/2007 | Bass et al. ..................... 709/203 |
| 8,631,411 B1* | 1/2014 | Ghose .......................... 718/102 |
| 8,886,361 B1* | 11/2014 | Harmon et al. ............... 700/291 |
| 2004/0024483 A1* | 2/2004 | Holcombe .................... 700/122 |
| 2004/0078153 A1* | 4/2004 | Bartone et al. ................. 702/57 |
| 2005/0018663 A1* | 1/2005 | Dropps et al. ................ 370/360 |
| 2007/0064604 A1* | 3/2007 | Chen et al. ................... 370/230 |
| 2007/0183320 A1* | 8/2007 | Chen et al. ................... 370/229 |
| 2007/0291732 A1* | 12/2007 | Todd et al. ................... 370/351 |
| 2008/0075028 A1* | 3/2008 | Park et al. .................... 370/311 |
| 2009/0123150 A1* | 5/2009 | Dropps et al. ................. 398/38 |

(Continued)

*Primary Examiner* — Jeffrey Nickerson
*Assistant Examiner* — Joseph M Cousins
(74) *Attorney, Agent, or Firm* — Ido Tuchman; Steven Chiu

(57) ABSTRACT

An energy management system for a data center network may include a central computer to establish an energy use policy for the computer data center network. The system may also include computer nodes in the computer data center network to receive a packet which is a query that obtains energy information from the nodes and/or a transmission reservation that provides instructions for the energy use policy to be implemented at the computer nodes. The computer nodes may reallocate data traffic on the computer data center network based on the energy use policy to improve energy consumption of the computer data center network.

13 Claims, 9 Drawing Sheets

(56) References Cited

U.S. PATENT DOCUMENTS

| | | | |
|---|---|---|---|
| 2009/0158063 A1* | 6/2009 | Wang et al. | 713/300 |
| 2009/0158074 A1* | 6/2009 | Oh et al. | 713/340 |
| 2009/0265568 A1* | 10/2009 | Jackson | 713/320 |
| 2010/0038963 A1* | 2/2010 | Shetty et al. | 307/62 |
| 2010/0145534 A1* | 6/2010 | Forbes et al. | 700/291 |
| 2010/0217451 A1* | 8/2010 | Kouda et al. | 700/291 |
| 2010/0218005 A1* | 8/2010 | Jain et al. | 713/300 |
| 2010/0318827 A1* | 12/2010 | Shah et al. | 713/324 |
| 2012/0117390 A1* | 5/2012 | Arndt et al. | 713/300 |
| 2012/0277921 A1* | 11/2012 | Shaffer et al. | 700/291 |

\* cited by examiner

ENERGY MANAGEMENT SYSTEM FOR A DATA CENTER NETWORK

CROSS-REFERENCE TO RELATED APPLICATIONS

This is a Continuation application to U.S. patent application Ser. No. 13/096,042 entitled "ENERGY MANAGEMENT SYSTEM FOR A DATA CENTER NETWORK", filed Apr. 28, 2011, which application is incorporated herein by reference.

BACKGROUND

The invention relates to the field of computer networking, and, more particularly, to energy management of data center networks.

A data center network includes a computer(s) and related systems such as power supply, auxiliary power supply, telecommunications interface/links, data storage, and/or the like. The data center network may also include environmental controls and security units for the foregoing.

SUMMARY

According to one embodiment of the invention, an energy management system for a data center network may include a central computer to establish an energy use policy for the computer data center network. The system may also include computer nodes in the computer data center network to receive a packet which is a query that obtains energy information from the nodes and/or a transmission reservation that provides instructions for the energy use policy to be implemented at the computer nodes. The computer nodes may reallocate data traffic on the computer data center network based on the energy use policy to improve energy consumption of the computer data center network.

The system may further include a load balancer to prioritize the data traffic and/or provide fairness in the reallocated data traffic. The load balancer may provide fairness by permitting some quantity of lower priority data to traverse the computer data center network along with higher priority data.

The energy use policy may enable the improvement of energy consumption of the computer data center network by reducing the data traffic flow through some of the computer nodes, reducing the energy requirements of some of the computer nodes, and/or reducing the number of the computer nodes used by the computer data center network during the reallocation of data traffic. The system may also include a software agent at each computer node and/or the central computer node to collect the query data. The central computer node may transmit the packet.

The transmission reservation may have control priority over the computer nodes rather than any other control measure on the computer data center network. The computer nodes comprise power supplies, data storage, climate controllers, communications links, and/or the like.

Another aspect of the invention is an energy conservation method for a computer data center network. The method may include establishing an energy use policy for the computer data center network. The method may also include transmitting a packet to computer nodes in the computer data center network that is a query to obtain energy information from the computer nodes and/or a transmission reservation to provide instructions for the energy use policy to be implemented at the computer nodes. The method may further include reallocating data traffic on the computer data center network based on the energy use policy to improve energy consumption of the computer data center network.

The method may additionally include using a load balancer to prioritize the data traffic and/or provide fairness in the reallocated data traffic. The method may also include providing fairness by permitting some quantity of lower priority data to traverse the computer data center network along with higher priority data.

The method may further include enabling the improvement of energy consumption of the computer data center network by reducing the data traffic flow through some of the computer nodes, reducing the energy requirements of some of the computer nodes, and/or reducing the number of the computer nodes used by the computer data center network during the reallocation of data traffic. The method may additionally include providing a central node to transmit the packet and a software agent at each computer node and/or the central node to collect the query data.

The method may also include giving the transmission reservation priority control over the computer nodes rather than any other control measure on the computer data center network. The computer nodes may comprise power suppliers, data storage, climate controllers, communications links, and/or the like.

Another aspect of the invention is a computer readable program codes coupled to tangible media to improve energy efficiency in a computer data center network. The computer readable program codes may be configured to cause the program to establish an energy use policy for the computer data center network. The computer readable program codes may also transmit a packet to computer nodes in the computer data center network that is a query to obtain energy information from the computer nodes and/or a transmission reservation to provide instructions for the energy use policy to be implemented at the computer nodes. The computer readable program codes may further reallocate data traffic on the computer data center network based on the energy use policy to improve energy consumption of the computer data center network.

The computer readable program codes may additionally use a load balancer to prioritize the data traffic and/or provide fairness in the reallocated data traffic. The computer readable program codes may also provide fairness by permitting some quantity of lower priority data to traverse the computer data center network along with higher priority data.

The computer readable program codes may further enable the improvement of energy consumption of the computer data center network by reducing the data traffic flow through some of the computer nodes, reducing the energy requirements of some of the computer nodes, and/or reducing the number of the computer nodes used by the computer data center network during the reallocation of data traffic. The computer readable program codes may additionally provide a central node to transmit the packet and a software agent at each computer node and/or the central node to collect the query data. The computer readable program codes may also give the transmission reservation priority control over the computer nodes rather than any other control measure on the computer data center network.

DETAILED DESCRIPTION

The invention will now be described more fully hereinafter with reference to the accompanying drawings, in which preferred embodiments of the invention are shown. Like numbers refer to like elements throughout, like numbers with letter suffixes are used to identify similar parts in a single embodiment, and letter suffix lower case n is a variable that indicates an unlimited number of similar elements.

Figure 1:
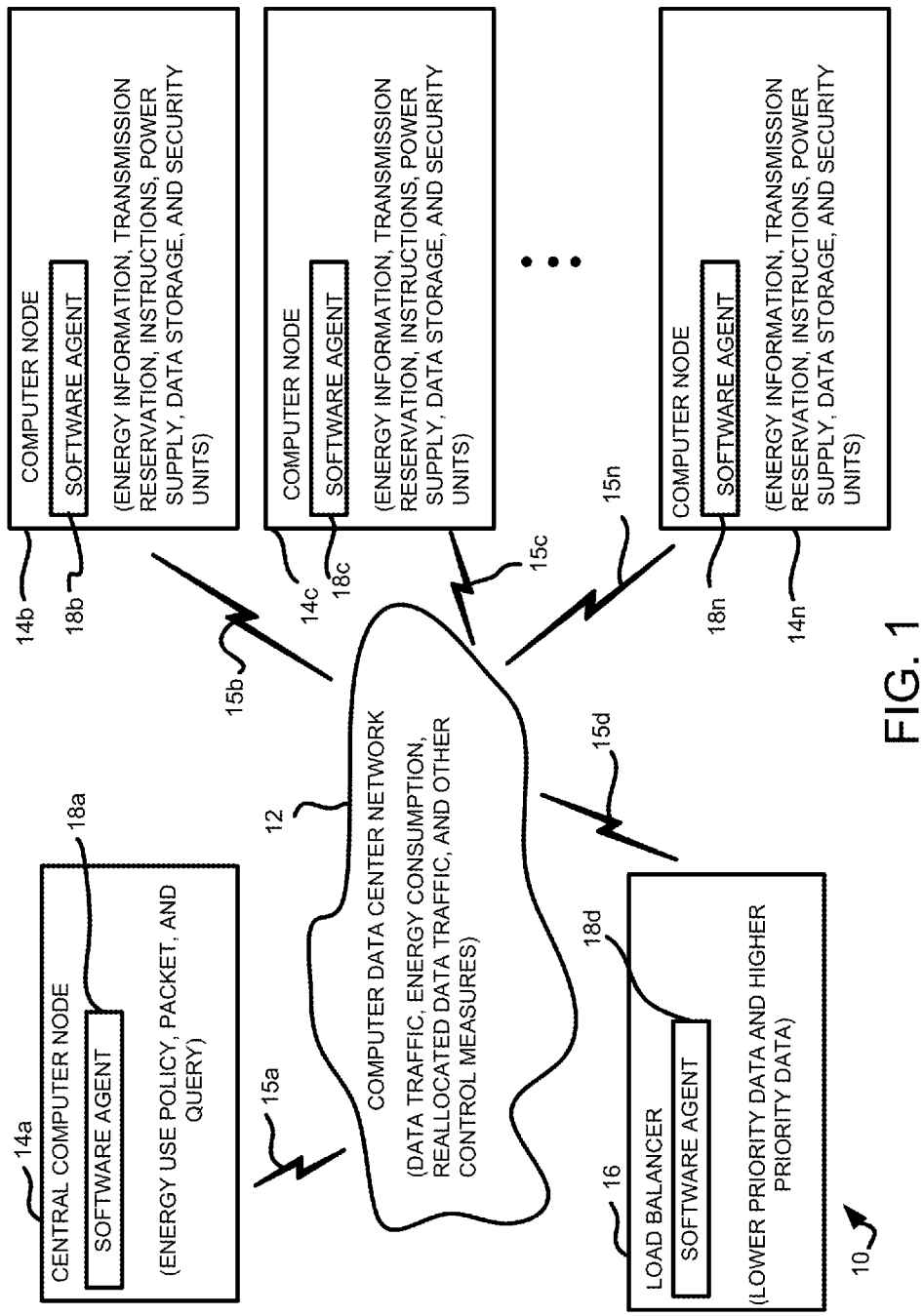
FIG. 1 is a block diagram illustrating an energy management system for a data center network in accordance with the invention.

With reference now to FIG. 1, an energy management system 10 for a data center network 12 is initially described. In an embodiment, the energy management system 10 for the data center network 12 includes a central computer 14a to establish an energy use policy for the computer data center network. The system also includes computer nodes 14b-14n in the computer data center network 12 to receive a packet which is a query that obtains energy information from the computer nodes and/or a transmission reservation that provides instructions for the energy use policy to be implemented at the computer nodes. In another embodiment, the computer nodes 14a-14n reallocate data traffic on the computer data center network 12 based on the energy use policy to improve energy consumption of the computer data center network.

In an embodiment, the system 10 further includes a load balancer 16 to prioritize the data traffic and/or provide fairness in the reallocated data traffic. In another embodiment, the load balancer 16 provides fairness by permitting some quantity of lower priority data to traverse the computer data center network 12 along with higher priority data. It will be understood that traffic prioritization may be associated with latency or bandwidth. Fairness allows low bandwidth data or data associated with higher permissible latency to be serviced for forward progress.

In an embodiment, the energy use policy enables the improvement of energy consumption of the computer data center network 12 by reducing the data traffic flow through some of the computer nodes 14a-14n, reducing the energy requirements of some of the computer nodes, and/or reducing the number of the computer nodes used by the computer data center network during the reallocation of data traffic. In another embodiment, the system 10 also includes a software agent 18a-18n at each computer node 14b-14n and/or the central computer 14a to collect the query data. In another embodiment, the central computer 14a transmits the packet.

In an embodiment, the transmission reservation has control priority over the computer nodes 14a-14n rather than any other control measure on the computer data center network 12. In another embodiment, the computer nodes 14a-14n comprise power supplies, data storage, climate controllers, communications links 15a-15n, and/or the like.

Figure 2:
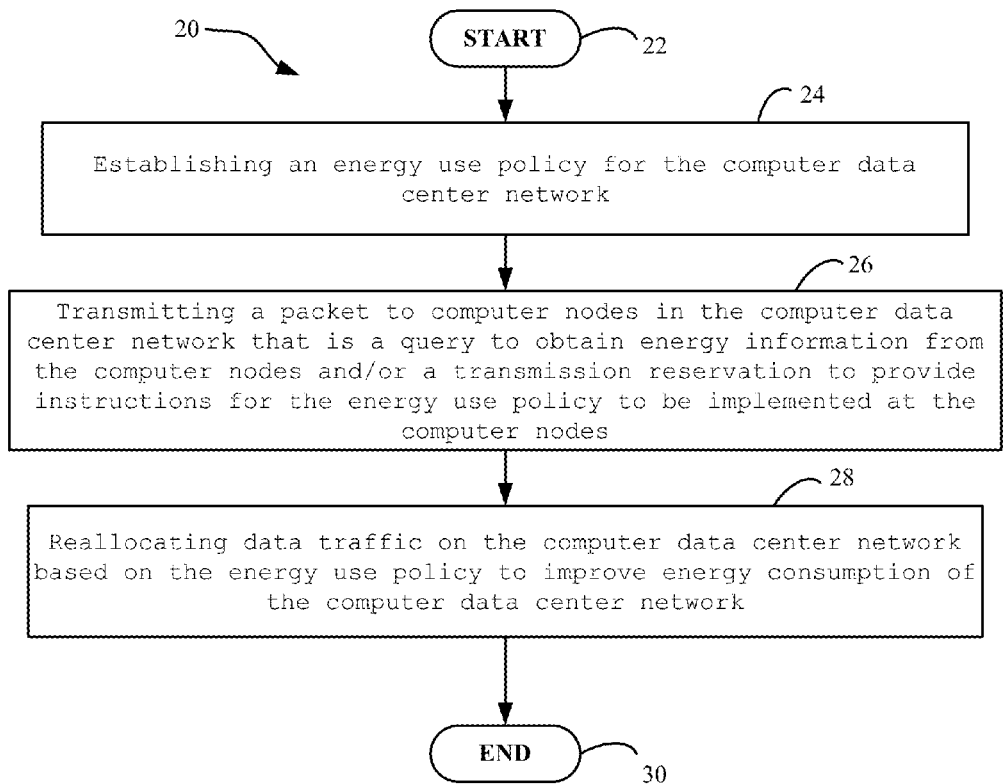
FIG. 2 is a flowchart illustrating method aspects according to the invention.

Another aspect of the invention is an energy conservation method for a computer data center network 12, which is now described with reference to flowchart 20 of FIG. 2. The method begins at Block 22 and may include establishing an energy use policy for the computer data center network at Block 24. The method may also include transmitting a packet to computer nodes in the computer data center network that is a query to obtain energy information from the computer nodes and/or a transmission reservation to provide instructions for the energy use policy to be implemented at the computer nodes at Block 26. The method may further include reallocating data traffic on the computer data center network based on the energy use policy to improve energy consumption of the computer data center network at Block 28. The method ends at Block 30.

Figure 3:
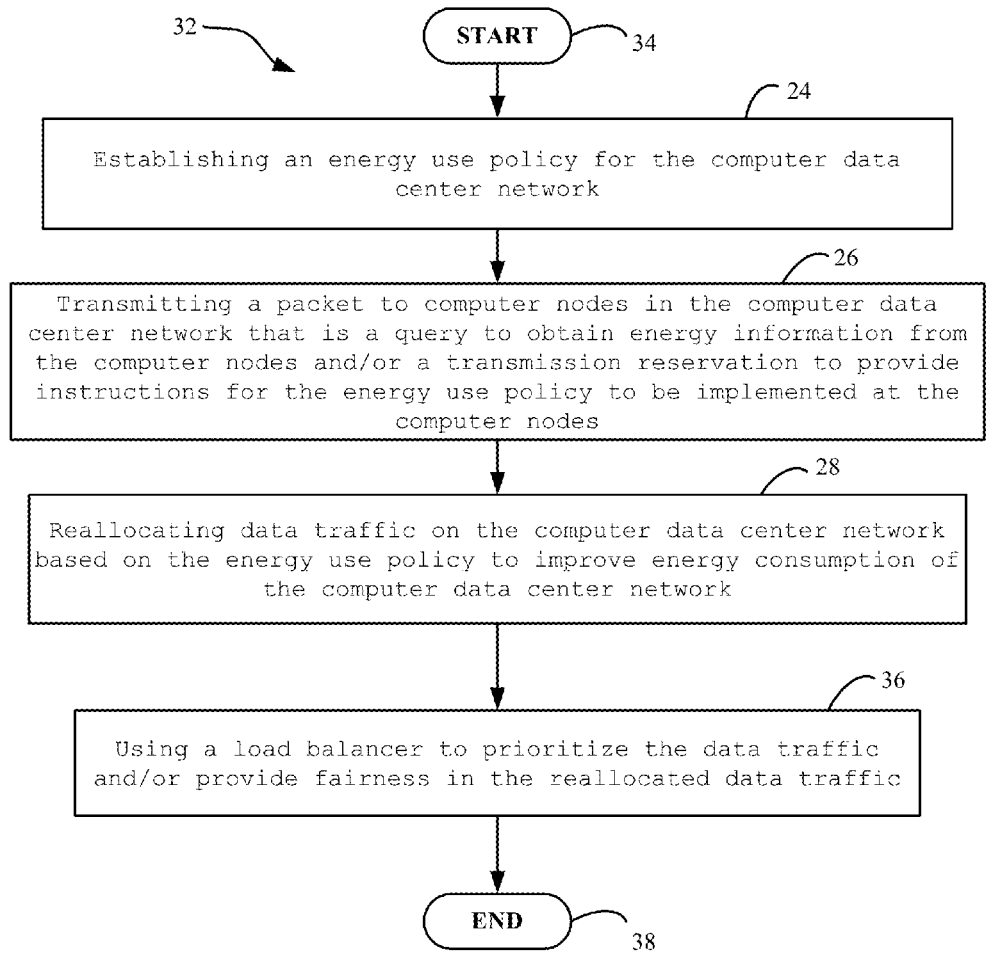
FIG. 3 is a flowchart illustrating method aspects according to the method of FIG. 2.

In another method embodiment, which is now described with reference to flowchart 32 of FIG. 3, the method begins at Block 34. The method may include the steps of FIG. 2 at Blocks 24, 26, and 28. The method may also include using a load balancer to prioritize the data traffic and/or provide fairness in the reallocated data traffic at Block 36. The method ends at Block 38.

Figure 4:
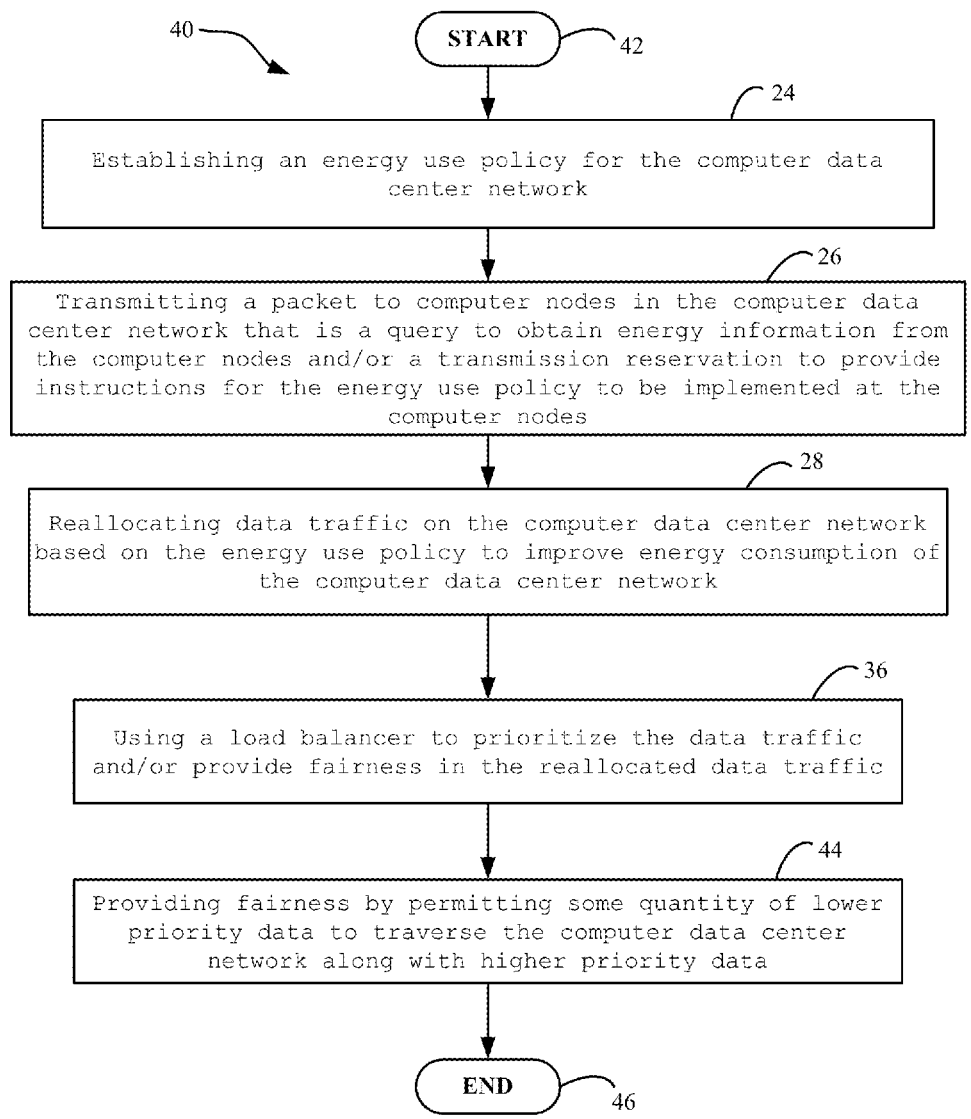
FIG. 4 is a flowchart illustrating method aspects according to the method of FIG. 3.

In another method embodiment, which is now described with reference to flowchart 40 of FIG. 4, the method begins at Block 42. The method may include the steps of FIG. 3 at Blocks 24, 26, 28, and 36. The method may also include providing fairness by permitting some quantity of lower priority data to traverse the computer data center network along with higher priority data at Block 44. The method ends at Block 46.

Figure 5:
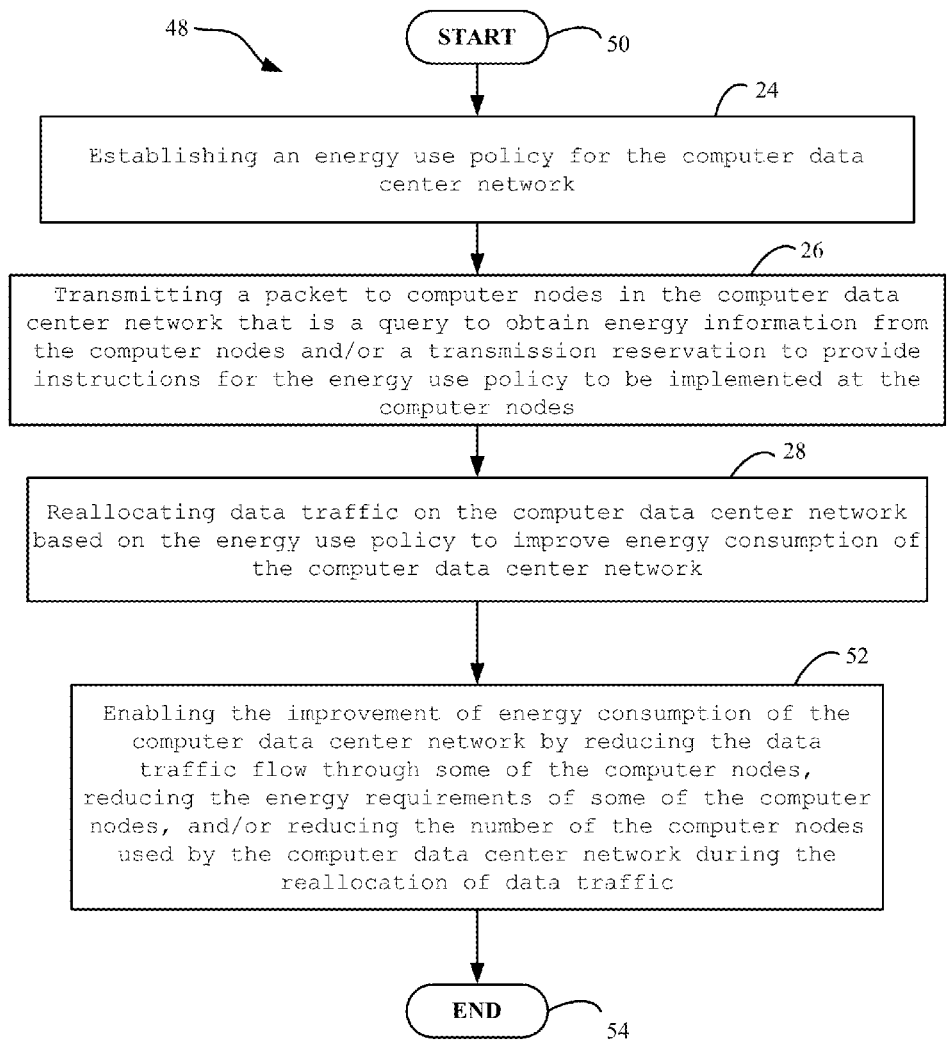
FIG. 5 is a flowchart illustrating method aspects according to the method of FIG. 2.

In another method embodiment, which is now described with reference to flowchart 48 of FIG. 5, the method begins at Block 50. The method may include the steps of FIG. 2 at Blocks 24, 26, and 28. The method may also include enabling the improvement of energy consumption of the computer data center network by reducing the data traffic flow through some of the computer nodes, reducing the energy requirements of some of the computer nodes, and/or reducing the number of the computer nodes used by the computer data center network during the reallocation of data traffic at Block 52. The method ends at Block 54.

Figure 6:
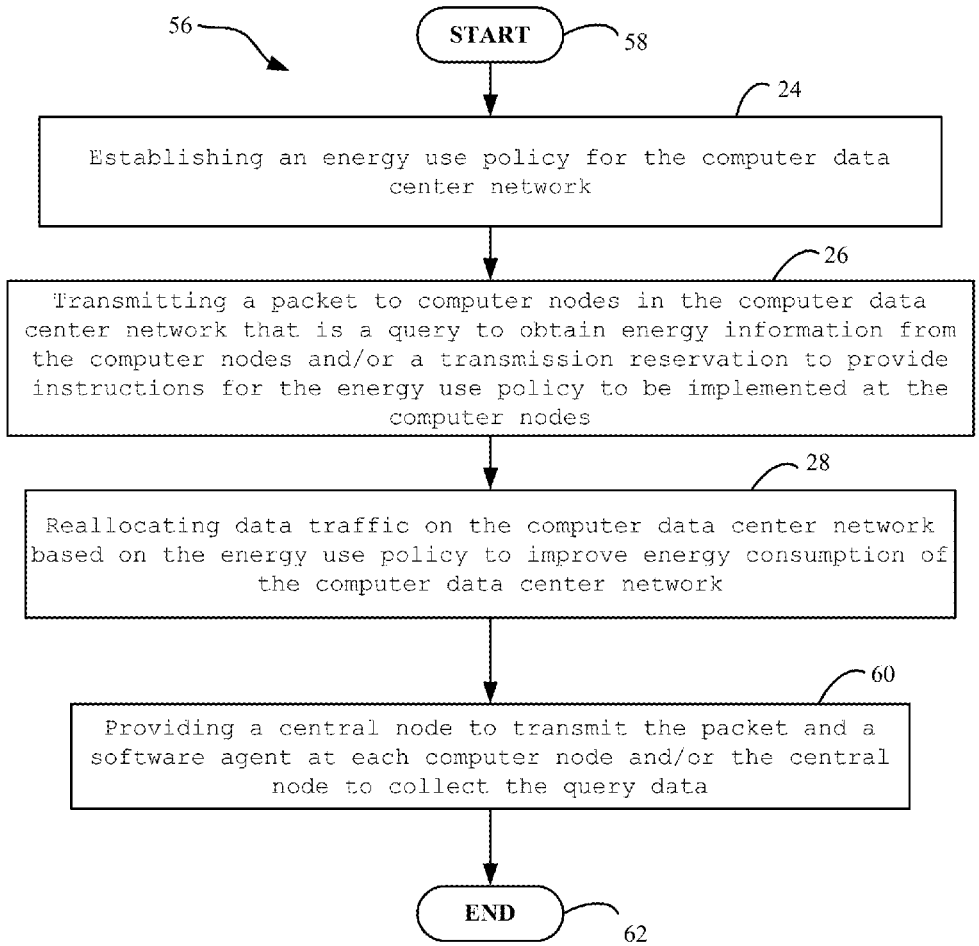
FIG. 6 is a flowchart illustrating method aspects according to the method of FIG. 2.

In another method embodiment, which is now described with reference to flowchart 56 of FIG. 6, the method begins at Block 58. The method may include the steps of FIG. 2 at Blocks 24, 26, and 28. The method may also include providing a central node to transmit the packet and a software agent at each computer node and/or the central node to collect the query data at Block 60. The method ends at Block 62.

Figure 7:
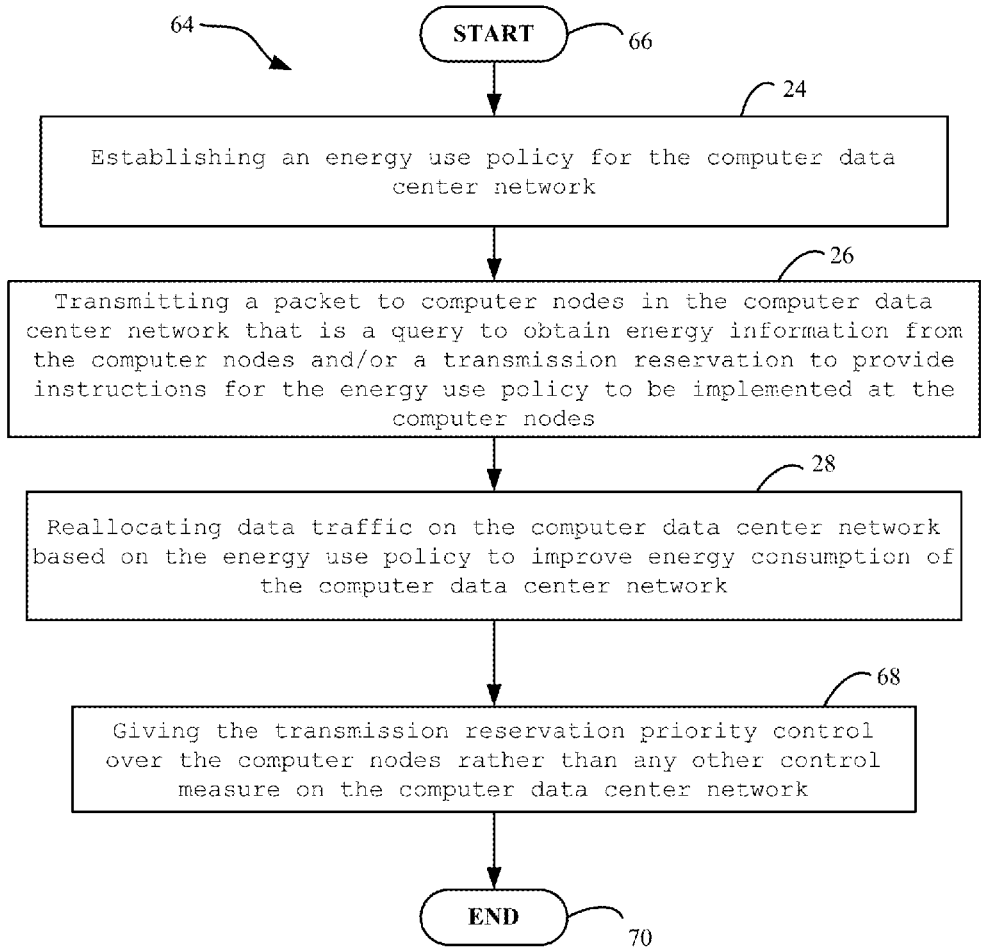
FIG. 7 is a flowchart illustrating method aspects according to the method of FIG. 2.

In another method embodiment, which is now described with reference to flowchart 64 of FIG. 7, the method begins at Block 66. The method may include the steps of FIG. 2 at Blocks 24, 26, and 28. The method may also include giving the transmission reservation priority control over the computer nodes rather than any other control measure on the computer data center network at Block 68. The method ends at Block 70.

Another aspect of the invention is a computer readable program codes coupled to tangible media to improve energy efficiency in a computer data center network 12. The computer readable program codes may be configured to cause the program to establish an energy use policy for the computer data center network 12. The computer readable program codes may also transmit a packet to computer nodes 14a-14n in the computer data center network 12 that is a query to obtain energy information from the computer nodes and/or a transmission reservation to provide instructions for the energy use policy to be implemented at the computer nodes. The computer readable program codes may further reallocate data traffic on the computer data center network 12 based on the energy use policy to improve energy consumption of the computer data center network.

The computer readable program codes may additionally use a load balancer 16 to prioritize the data traffic and/or provide fairness in the reallocated data traffic. The computer readable program codes may also provide fairness by permitting some quantity of lower priority data to traverse the computer data center network 12 along with higher priority data.

The computer readable program codes may further enable the improvement of energy consumption of the computer data center network 12 by reducing the data traffic flow through some of the computer nodes 14a-14n, reducing the energy requirements of some of the computer nodes, and/or reducing the number of the computer nodes used by the computer data center network during the reallocation of data traffic. The computer readable program codes may additionally provide a central node 14a to transmit the packet and a software agent 18 at each computer node 14b-14n and/or the central node to collect the query data. The computer readable program codes may also give the transmission reservation priority control over the computer nodes 14a-14n rather than any other control measure on the computer data center network 12.

In view of the foregoing, the system 10 improves energy management for a data center network 12. For example, today's data center networks energy management systems do not include the facility's assets like room cooling, heating, power distribution, and/or the like in data center. In addition, present data center network energy management systems do not extend to the utilities and energy source grid to obtain an optimal energy-cost balance in the extended network.

In an embodiment, the system 10 includes a Converged Enhanced Ethernet (CEE) and/or Fiber Channel over Ethernet (FCoE) data center network having computer nodes 14a-14n connected by a plurality of switches, e.g. central node 14a, through which traffic, on the network 12, is routed. The system 10 manages the energy consumption of the network 12 by establishing an energy use policy for the data center network 12. The system 10 also transmits a packet to all of the nodes 14a-14n in the network whereby the packet is either a query packet that queries (or obtains information from) entries in a switch management information base (MIB), or a transmission reservation request packet that contains instructions which describe the energy management policy to be implemented on the central node 14a, e.g. switch. In addition, an enhanced transmission selection (ETS) load balancer 16 reallocates traffic on the network 12 based on the energy use policy that results in improved energy consumption for the entire network.

The system 10 allows both the collection of energy consumption data in the network 12 and an automated method to transmit and implement the energy policy of the data center. The system 10 also extends the datacenter network 12 beyond conventional information technology networks in known solutions, to include facility's physical assets and the power grid.

The system 10 uses a new protocol which supports reservation of network 12 components, e.g. nodes 14a-14n, for energy management purposes, and collection of energy consumption data from network equipment, e.g. nodes 14a-14n. The protocol includes a special packet type which is transmitted across the network 12 to collect energy consumption information from the central node 14a, e.g. switch MIB, and relay it back to a central coordination facility. Further, this protocol supports reservation of resources across an FCoCEE network 12, such that applications running on the end systems can use this protocol to indicate to other network nodes 14a-14n the switch 14a provisioning which will yield optimal energy consumption for the overall data center.

Figure 8:
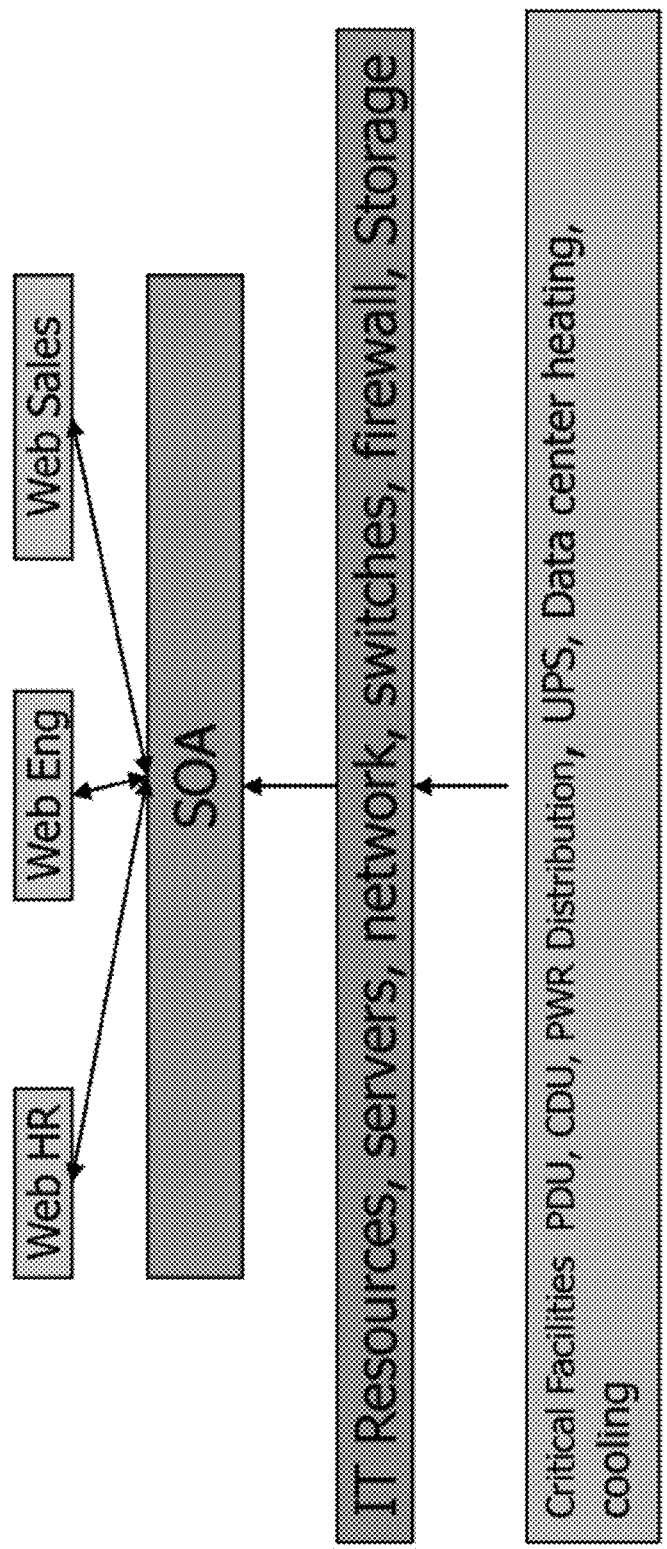
FIG. 8 is a block diagram illustrating data center IT and facilities in accordance with the invention.
Figure 9:
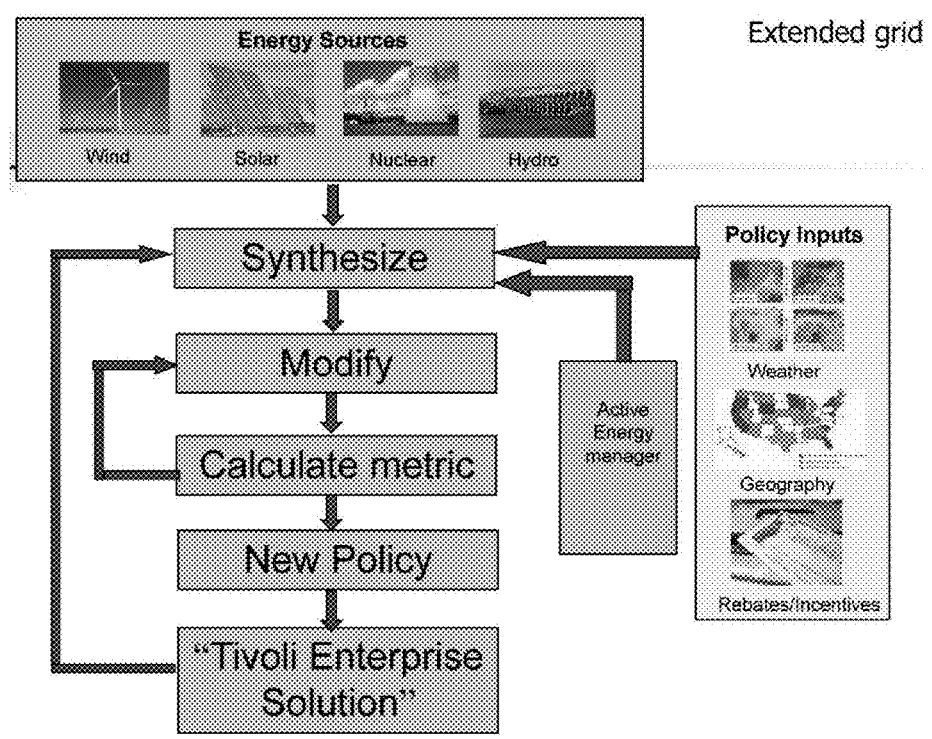
FIG. 9 is a block diagram illustrating the extended grid in accordance with the invention.

With reference to FIGS. 8 and 9, system 10 also provides a service oriented architecture (SOA) solution around end-to-end energy management, in which each network 12 consists of a type of service (Web application), associated IT (Processors, storage, firewall, and/or the like), physical assets (servers, PDU, CDU, and/or the like), and/or facilities (AC/DC converters, UPS, EMI filters, CBs, room air conditioner, heater, and/or the like). The SOA collects energy use information from network 12 elements using the protocol described above, and provisions the switches 14a with its energy policy in the same manner. This SOA, which may run on a partition in a server attached to the network 12, may employ extensions to existing International Business Machines software products such as Tivoli Active Energy Manager.

Further, the SOA may collect data from other sources including available public utilities, and automatically select desired energy sources as a function of cost, compliance requirements, and user defined policy (for example, mandating that 20% of all power come from green or renewable sources). In this way the SOA acts like a smart energy meter for the entire data center, including the network 12. The SOA can provision the network 12 equipment using the resource reservation protocol mentioned earlier, for example to balance energy consumption across multiple VLANs or to concentrate traffic across newer, more energy efficient switches.

The new energy reservation protocol would consist of a new packet type which would be recognized by each switch node in the network. The packet may contain a query for the switch to provide energy usage information or a request to reserve transmission across certain ports or VLANs in response to the data center energy policy.

If the packet is a query, system 10 adds new entries into the switch MIB which would provide this information. The existence of such entries is a new feature. The entries may include things like a list of what data rates are running on what ports in the switch (typically higher data rate links consume more energy); link utilization information; or direct reading from thermal or voltage monitors within the switch (most switches use intelligent power supplies which are dual redundant; they can switch to a redundant supply if the current draw is too high indicating a potential power supply fault, or they can increase fan speed in case the chassis temperature gets too high). New monitoring parameters are being defined over time, and can be examples of data system 10 might collect.

If the packet is a transmission reservation request, then system 10 interfaces with the switch management system or possibly ETS to reallocate traffic flows. Currently there is no method defined for implementing an energy use policy on network 12 devices. For example, when there's a power shortage in an area, the power supplier will call customers and ask them to shut down non-essential equipment for a few hours; the customer site does this and makes a public address announcement when such things are in effect. If there was a power shortage, the data center policy might call for all traffic to be rerouted until all links had, say, 80% utilization; this would likely slow down the network 12, but it's better than taking it down due to a site power loss. The case of emergency power reductions is an extreme example; system 10 would rebalance traffic on a routine basis in compliance with the site energy policy.

In an embodiment, the site energy policy might call for 10% of the energy used to come from "green" renewable sources. A software extension and management agent, e.g. software agent 18a-18n (likely a SOA architecture) will provide this data and analyze it; data collected from the reservation protocol, data collected from facilities and grid, can be inputs to the SOA service bus. The energy usage for each end user service (like HR information, Eng. Information, Marketing information and/or the like) can be estimated and based on the criticality of the service, energy priority can be established. This management code could likely be an extension to Tivoli active energy manager. By collecting data from sources other than the switch (for example, load data from an energy provider which would allow system 10 to anticipate high power draw time periods, temperature data from facilities assets which would allow system 10 to control data center cooling, heating, and/or the like), system 10 can determine site wide configuration for optimal energy use (with automated feedback).

In an embodiment, the details of ETS interface to the Switch are as follows. The switch receives and recognizes a reservation packet, and the packet contains a flag indicating that it's being used in request mode. The packet contains instructions which describe the energy management policy to be implemented on the switch. For example, rebalance traffic such that all links are running at 80% or better utilization. Such information is routed to the input load balancer 16 on ETS, where ETS recognizes that this instruction is a priority override for whatever other policy is in use. The ETS manager informs the switch that it has received this instruction. The load balancer recalculates its traffic profile to meet the requested condition. The new traffic profile is provisioned on the switch. The new traffic profile might involve throttling the sender at the computer node to slow the transmission of data and conserve energy. It may also be achieved by backpressure from a receiving node. It will be understood that computer datacenter networks are usually built with redundant paths for packets to reach a computer node. The new traffic profile recalculated by the load balancer may be implemented by turning off ports related to redundant paths to conserve energy and allowing packets through a single primary path (at the possible expense of latency or link availability characteristics). The aforementioned methods allow end to end (computer node to computer node) latency or bandwidth to be traded off for enhanced energy conservation. Such methods are useful since contemporary switch designs disallow port-card to port-card latency to be sacrificed for energy conservation purposes. The ETS overrides lossy or low priority group requests in favor of implementing high priority requests and energy policy. The ETS sends an acknowledgment that the policy instruction has been received, and optionally, it sends another acknowledgement when the policy has been implemented.

In an embodiment, the switch receives and recognizes a reservation packet, and the packet contains a flag indicating that it's being used in request mode. The packet contains instructions that describe the energy management policy to be implemented on the switch. For example, rebalance traffic such that all links are running at 80% or better utilization. This information is routed to the input load balancer 16 on ETS, where ETS recognizes that this instruction is a priority override for whatever other policy is in use.

In addition, the ETS manager informs the switch that it has received this instruction. The load balancer 16 recalculates its traffic profile to meet the requested condition. ETS overrides lossy or low priority group requests in favor of implementing high priority requests and energy policy. ETS sends an acknowledgment that the policy instruction has been received, and optionally it sends another acknowledgment when the policy has been implemented.

In an embodiment, system 10 establishes an energy use policy for the data center network. Further, based on SOA, creates networks that consist of type of service (web application), associated IT (processors, storage, firewall, and/or the like), physical assets (servers, PDU, CDU, and/or the like), facilities (AC/DC converters, UPS, EMI Filters, CBs, room air conditioner, heater, and/or the like) and extended network that includes Tivoli manger and power grid information. Each service to be optimized for energy consumption considers the entire integrated network 12.

The SOA may collect data from other sources including available public utilities, and automatically select desired energy sources as a function of cost, compliance requirements, and user defined policy (for example, mandating that 20% of all power come from green or renewable sources). In this way the SOA acts like a smart energy meter for the entire data center, including the network 12. The SOA can provision the network equipment using the resource reservation protocol mentioned earlier, for example to balance energy consumption across multiple VLANs or to concentrate traffic across newer, more energy efficient switches.

The system 10 provides many energy optimization steps. For example, system 10 maximizes utilization of ports that are usually used by shifting traffic from other ports. On each system, if some functions are not enabled, system 10 turns them off and/or eliminates them. Furthermore, system 10 monitors idle links and/or ports with light traffic, and shifts traffic and switches off idle ports.

Additionally, system 10 considers headroom requirements proactively. System 10 monitors load conditions on the power supplies, and if power supply is not fully loaded, then switch loads from other data centers that need peak power. System 10 monitors inlet outlet temperature and adjusts the CDU use as a function of heat dissipation. Moreover, the building and cooling is adjusted depending on the heat dissipation. System 10 controls room cooling as a function of CDU load. System 10 provides non-critical services resource sharing over the network.

At light, moderate, and high loads, system 10 allocates/shares resource (CPU/memory, temperature sensors, and/or the like) with other virtual data centers. System 10 adjusts equipment location to optimize cooling and performance. System 10 distinguishes the type of data, peaks, chatty vs. critical data, and/or the like to create traffic profiles. The peak bandwidth requirement is based on requirements shared with other networks. Furthermore, system 10 switches non-critical loads to off-peak times, and/or provides a green service option.

In an embodiment, system 10 analyzes this data and extrapolates information such as ports or links that may not be used, redundancy requirements, and so on. A network administrator may ask the following: If a certain port(s) is not being used, can it be disabled? Is redundancy required at link or node level? What is the fine balance to be maintained between redundancy and higher capacity? At a larger context, can there be a set of best practices that can be derived from the data? What would be the cost impact? The answers to these questions and the data can serve as an input to the planning for an energy efficient network. Taking an example of Ethernet, the two ends of the link transmit "1"s over an idle link. So a link that is not being used for active data transmission is still consuming power required to transmit those bits. If this port if administratively disabled, this power can be saved.

It should be noted that in some alternative implementations, the functions noted in a flowchart block may occur out of the order noted in the figures. For instance, two blocks shown in succession may, in fact, be executed substantially concurrently, or the blocks may sometimes be executed in the reverse order, depending upon the functionality involved because the flow diagrams depicted herein are just examples. There may be many variations to these diagrams or the steps (or operations) described therein without departing from the spirit of the invention. For example, the steps may be performed concurrently and/or in a different order, or steps may be added, deleted, and/or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
   establishing an energy use policy for a computer data center network;
   transmitting a packet to computer nodes in the computer data center network that is at least one of a query to obtain energy information from the computer nodes and a transmission reservation to provide instructions for the energy use policy to be implemented at the computer nodes; and
   reallocating data traffic on the computer data center network based on the energy use policy to improve energy consumption of the computer data center network.

2. The method of claim 1 further comprising using a load balancer to at least one of prioritize the data traffic and provide fairness in the reallocated data traffic.

3. The method of claim 2 further comprising providing fairness by permitting some quantity of lower priority data to traverse the computer data center network along with higher priority data.

4. The method of claim 1 further comprising enabling the improvement of energy consumption of the computer data center network by reducing at least one of the data traffic flow through some of the computer nodes, energy requirements of some of the computer nodes, and a number of the computer nodes used by the computer data center network during the reallocation of data traffic.

5. The method of claim 1 further comprising providing a central node to transmit the packet and a software agent at at least one of each computer node and the central node to collect the energy information.

6. The method of claim 1 further comprising giving the transmission reservation priority control over the computer nodes rather than any other control measure on the computer data center network.

7. The method of claim 1 wherein the computer nodes comprise at least one of power supplies, data storage, climate controllers, communications links, and security units.

8. A computer program product embodied in a non-transitory tangible medium comprising:
   computer readable program codes coupled to the non-transitory tangible medium to improve energy consumption of a computer data center network, the computer readable program codes configured to cause the program to:
      establish an energy use policy for a computer data center network and collect energy costs from a plurality of utilities provisioning energy to the computer data center network;
      transmit a packet to computer nodes in the computer data center network that includes a query to obtain current draw information from the computer nodes and a transmission reservation to provide instructions for the energy use policy to be implemented at the computer nodes;
      determine an optimal utilities configuration for the plurality of utilities provisioning energy to the computer data center network that yields an optimal energy consumption for the computer data center network based on the energy costs and the energy use policy;
      reallocate data traffic on the computer data center network based on the optimal utilities configuration.

9. The computer program product of claim 8 further comprising program code configured to: use a load balancer to at least one of prioritize the data traffic and provide fairness in the reallocated data traffic.

10. The computer program product of claim 8 further comprising program code configured to: provide fairness by permitting some quantity of lower priority data to traverse the computer data center network along with higher priority data.

11. The computer program product of claim 8 further comprising program code configured to: enable the improvement of energy consumption of the computer data center network by reducing at least one of the data traffic flow through some of the computer nodes, energy requirements of some of the computer nodes, and a number of the computer nodes used by the computer data center network during the reallocation of data traffic.

12. The computer program product of claim 8 further comprising program code configured to:
provide a central node to transmit the packet; and
provide a software agent at each computer node and the central node to collect the energy information.

13. The computer program product of claim 8 further comprising program code configured to: give the transmission reservation priority control over the computer nodes rather than any other control measure on the computer data center network.

* * * * *